(12) United States Patent
Wang He

(10) Patent No.: US 8,979,339 B2
(45) Date of Patent: Mar. 17, 2015

(54) LIGHT SOURCE MODULE HAVING LIGHT GUIDING POLE WITH SLOT FOR EMITTING LIGHT RAYS

(71) Applicant: Hon Hai Precision Industry Co., Ltd., New Taipei (TW)

(72) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 35 days.

(21) Appl. No.: 13/851,081

(22) Filed: Mar. 26, 2013

(65) Prior Publication Data

US 2014/0177261 A1 Jun. 26, 2014

(30) Foreign Application Priority Data

Dec. 20, 2012 (TW) .............................. 101148843 A

(51) Int. Cl.
| | |
|---|---|
| *F21K 99/00* | (2010.01) |
| *F21V 7/00* | (2006.01) |
| *G02B 6/00* | (2006.01) |
| *F21Y 101/02* | (2006.01) |
| *F21Y 103/00* | (2006.01) |

(52) U.S. Cl.
CPC .............. *G02B 6/00* (2013.01); *F21Y 2101/02* (2013.01); *F21Y 2103/00* (2013.01)
USPC ........... 362/555; 362/551; 362/560; 362/600; 362/610; 362/612

(58) Field of Classification Search
USPC .......... 362/600, 609, 610, 615, 617–625, 555
See application file for complete search history.

(56) References Cited

U.S. PATENT DOCUMENTS

| | | | | |
|---|---|---|---|---|
| 5,461,547 | A * | 10/1995 | Ciupke et al. ................ | 362/617 |
| 5,729,311 | A * | 3/1998 | Broer et al. .................. | 349/65 |
| 7,876,397 | B2 * | 1/2011 | Krijn et al. ................... | 349/65 |
| 2008/0030650 | A1 * | 2/2008 | Kitagawa et al. ............ | 349/65 |
| 2009/0154196 | A1 * | 6/2009 | Lin et al. ...................... | 362/613 |
| 2009/0168457 | A1 * | 7/2009 | Lai et al. ...................... | 362/618 |
| 2012/0176811 | A1 * | 7/2012 | Nakai et al. .................. | 362/602 |

* cited by examiner

*Primary Examiner* — Sikha Roy
(74) *Attorney, Agent, or Firm* — Novak Druce Connolly Bove + Quigg LLP

(57) ABSTRACT

A light source module includes a light source and a light guiding pole. The light guiding pole is made of transparent material and has a light incident surface and at least one side surface connected to the light incident surface. The light source emits light rays, and faces the light incident surface. The light incident surface guides the light rays into the light guide pole, and the at least one side surface totally reflects the light rays. At least one slot is defined at the at least one side surface, and extends along a lengthwise direction of the light guiding pole. The at least one slot destroys the totally reflective path of a portion of the light rays arriving the at least one side surface, and thus the portion of the light rays emits from the at least one side surface.

8 Claims, 3 Drawing Sheets

LIGHT SOURCE MODULE HAVING LIGHT GUIDING POLE WITH SLOT FOR EMITTING LIGHT RAYS

BACKGROUND

1. Technical Field

The present disclosure relates to a light source module.

2. Description of Related Art

Currently, a light source module has only one light emitting surface, and can not illuminate at a range of 360 degrees.

Therefore, it is desirable to provide a light source module that can overcome the above-mentioned limitations.

BRIEF DESCRIPTION OF THE DRAWINGS

Many aspects of the embodiments should be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
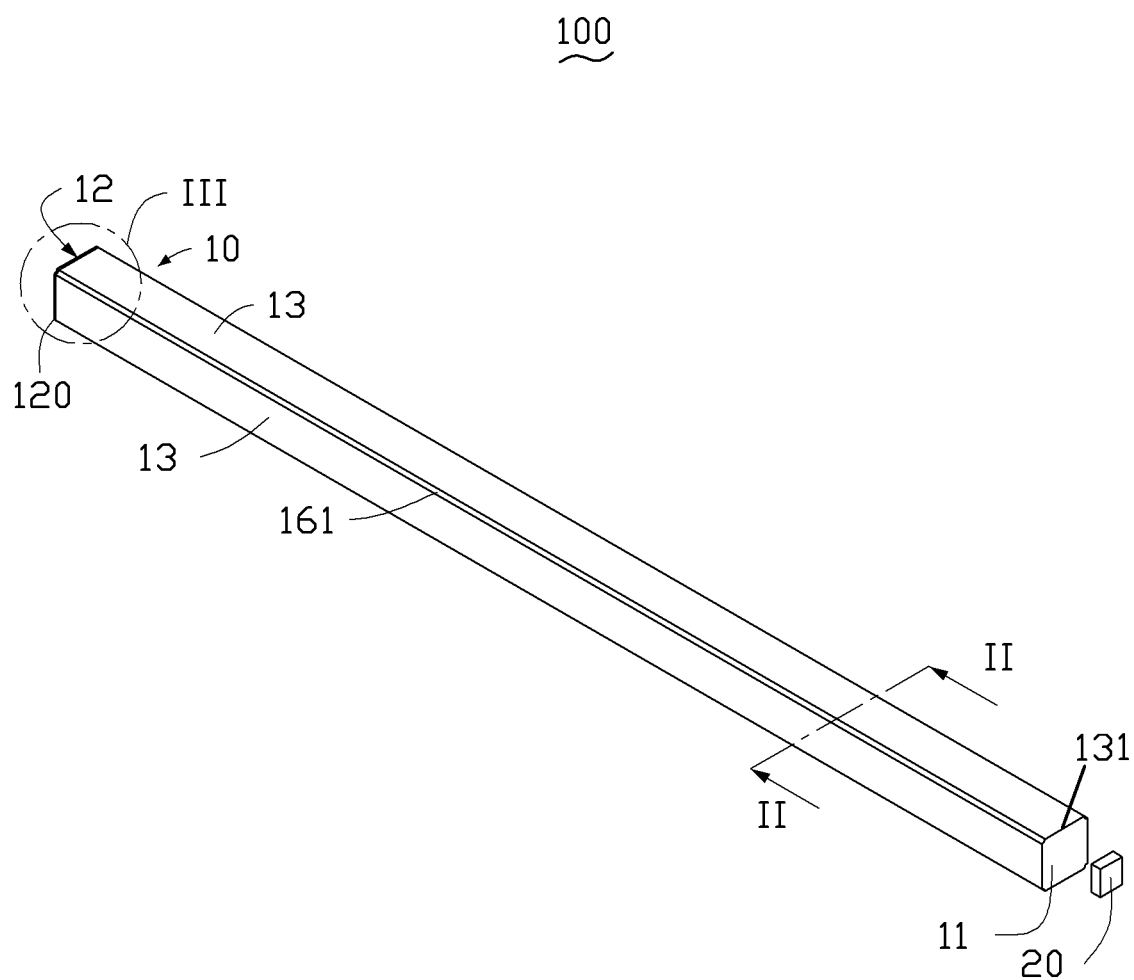
FIG. 1 is a schematic view of a light source module, according to an exemplary embodiment.

FIG. 1 illustrates a light source module 100 in accordance with an embodiment. The light source module 100 includes a light guiding pole 10 and a light source 20. In this embodiment, the light source 20 is a light emitting diode (LED). The number of the light sources 20 is not limited to this embodiment.

The light guiding pole 10 is substantially cubic, and is made of transparent material (such as acrylic resin or polyethylene resin). The light guiding pole 10 includes a light incident surface 11, an end surface 12 opposite to the light incident surface 11, and four side surfaces 13. The four side surfaces 13 are perpendicularly connected to the light incident surface 11 and the end surface 12. The shapes and the areas of the four side surfaces 13 are substantially the same as each other.

Figure 2:
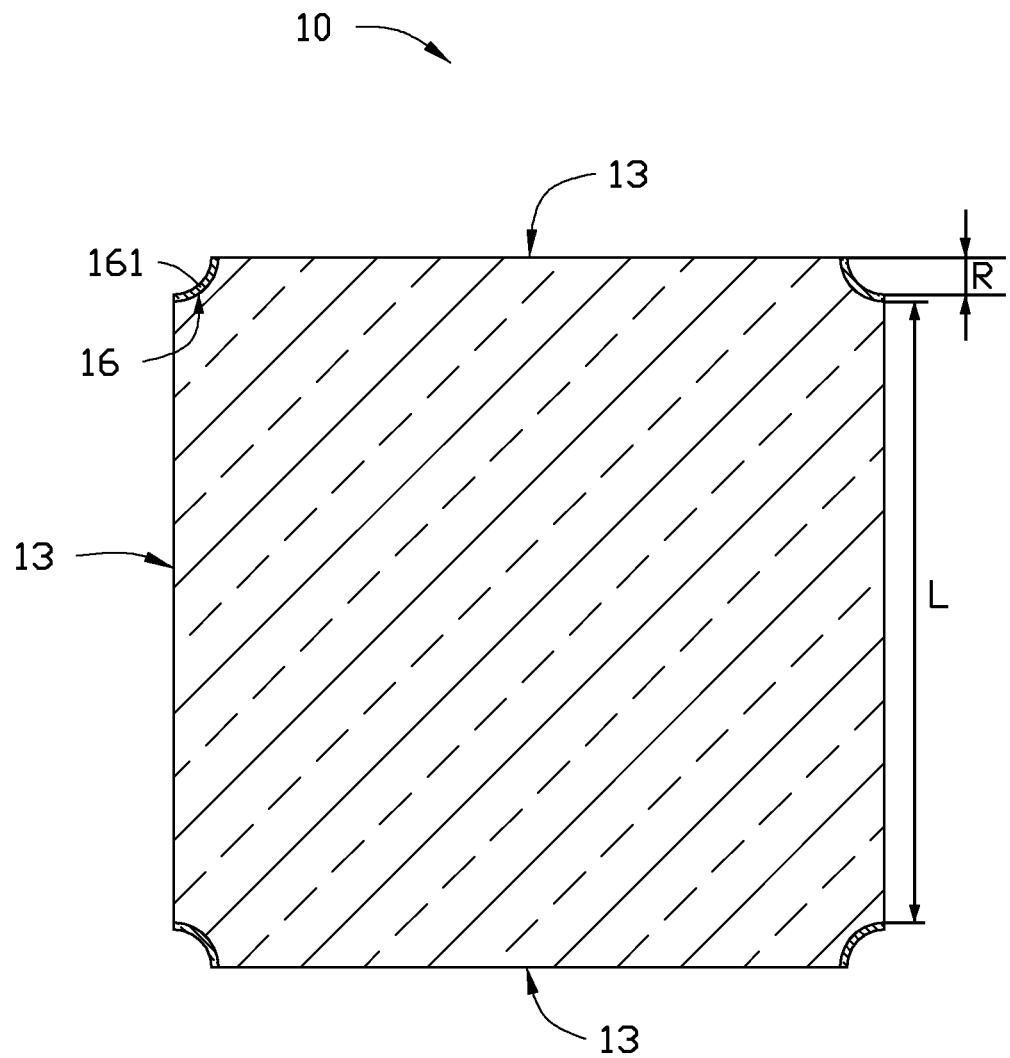
FIG. 2 is a cross-sectional view of the light source module of FIG. 1 taken along a line II-II.

FIG. 2 shows that a slot 16 is defined at an intersection of each two adjacent side surfaces 13, and thus the light guiding pole 10 has four slots 16. Each of the slots 16 extends along a lengthwise direction of the light guide pole 10, and the length of each of the slots 16 is substantially equal to the length of the side surface 13. A cross-section of the slot 16 along a direction perpendicular to the lengthwise direction of the light guiding pole 10 is a quarter of a circle. Each of the side surfaces 13 is substantially rectangular, and has a short edge 131. The length of the short edge 131 is L, and the radius of the slot 16 is R, wherein L/R≥13, and thus the brightness of each of the side surfaces 13 is distributed uniformly. The number of the slots 16 is not limited to this embodiment.

Figure 3:
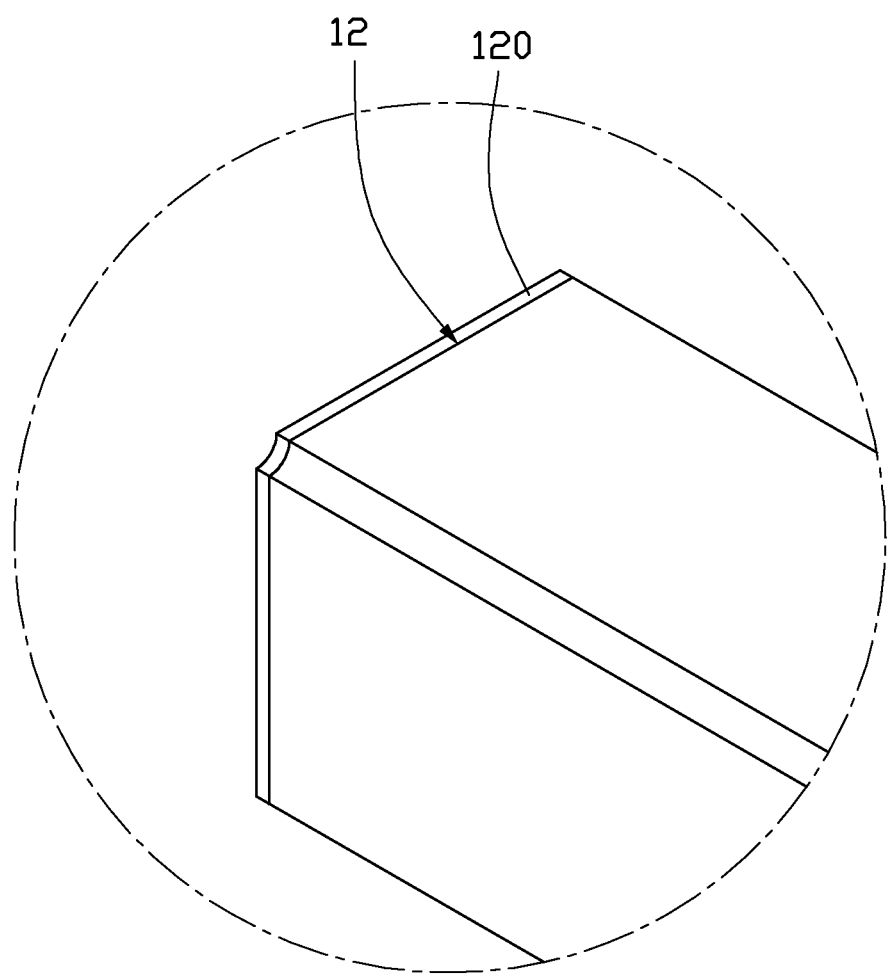
FIG. 3 is a schematic enlarged view of a circled portion III of the light source module of FIG. 1.

Each of the slots 16 is coated with a first reflective film 161. FIG. 3 shows that the end surface 12 is coated with a second reflective film 120.

The light source 20 faces the light incident surface 11. The light rays from the light source 20 enter the light guiding pole 10 through the light incident surface 11. The light incident surface 11 is smooth to reduce the optical energy loss when the light source 20 is optically coupled with the light guiding pole 10.

The light transmitting path of the light source module 100 is as follows: the light rays from the light source 20 enter the light guiding pole 10 through the light incident surface 11, and are totally reflected by the four side surfaces 13 towards the end surface 12. The four slots 16 destroy the total reflective paths of a portion of the light rays, and thus the portion of the light rays emit from the side surfaces 13. The total reflective paths of the other portion of the light rays are not destroyed by the four slots 16, and thus the other portion of the light rays are still transmitted towards the end surface 12. The second reflective film 120 reflects the light rays arriving thereon to prevent the light rays from emitting outwards, and then the light rays reflected by the second reflective film 12 are emitted outwards from the four side surfaces 13, therefore the brightness of the four side surface 13 is increased.

By employing the light source module 100, the slots 16 destroy the total reflective path of a portion of the light rays, and thus the portion of the light rays transmits from the four side surfaces 13, at the same time, the light rays reflected by the end surface 12 are also emitted from the four side surfaces 13, therefore, the light source module 100 can illuminate at a range of 360 degrees.

In other embodiments, the shape of the light guiding pole 10 also can be other shapes, such as cylindrical, prism-shaped.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A light source module, comprising:

a light source for emitting light rays; and a light guiding pole made of transparent material and comprising a light incident surface facing the light source and at least one side surface connected to the light incident surface, wherein the light incident surface is configured for guiding the light rays into the light guide pole, and the at least one side surface is configured for totally reflecting the light rays; at least one slot is defined at the at least one side surface, and extends along a lengthwise direction of the light guiding pole, the at least one slot is configured for destroying the totally reflective path of a portion of the light rays arriving the at least one side surface, and thus the portion of the light rays emits from the at least one side surface.

2. A light source module, comprising:

a light source for emitting light rays; and a light guiding pole made of transparent material and comprising a light incident surface facing the light source and at least one side surface connected to the light incident surface, wherein the light incident surface is configured for guiding the light rays into the light guide pole, and the at leas one side surface is configured for totally reflecting the light rays; at least one slot is defined at the at least one side surface, and extends along a lengthwise direction of the light guiding pole, the at least one slot is configured for destroying the totally reflective path of a portion of the light rays arriving the at least one side surface, and thus the portion of the light rays emits from the at least one side surface;

wherein the light guiding pole is cubic, the number of the at least one side surface is four, the number of the at least one slot is four, and each of the four slots is defined at an intersection of each two adjacent side surfaces.

3. The light source module of claim 2, wherein a cross-section of each of the slots along a direction perpendicular to the lengthwise direction of the light guiding pole is a quarter of a circle.

4. The light source module of claim 3, wherein each of the side surfaces has a short edge, the length of the short edge is L, the radius of each of the slots is R, and $L/R \geq 13$.

5. The light source module of claim 2, wherein each of the slots is coated with a first reflective film.

6. The light source module of claim 5, wherein the light guiding pole comprises an end surface opposite to the light incident surface, the four side surfaces are perpendicularly connected to the end surface, and the end surface is coated with a second reflective film for totally reflecting the light rays arriving thereon.

7. The light source module of claim 1, wherein the light incident surface is smooth.

8. The light source module of claim 1, wherein the light source is a light emitting diode.

* * * * *